Patented Aug. 12, 1941

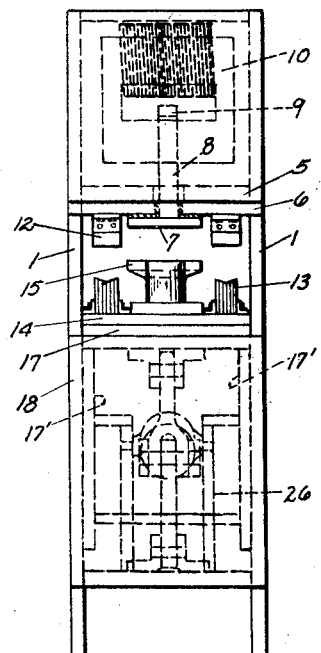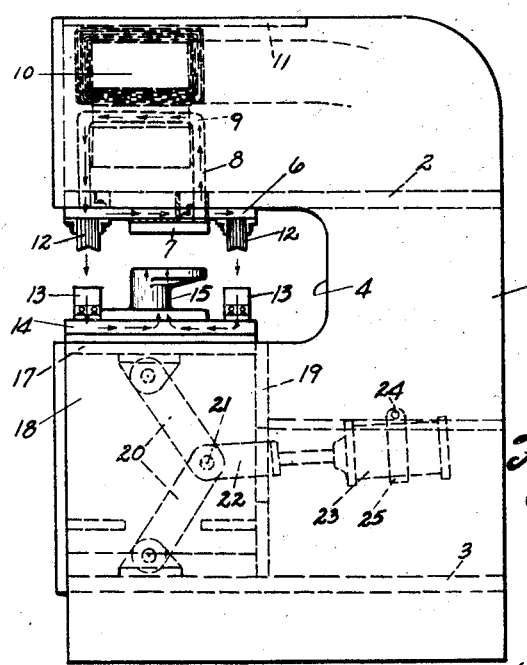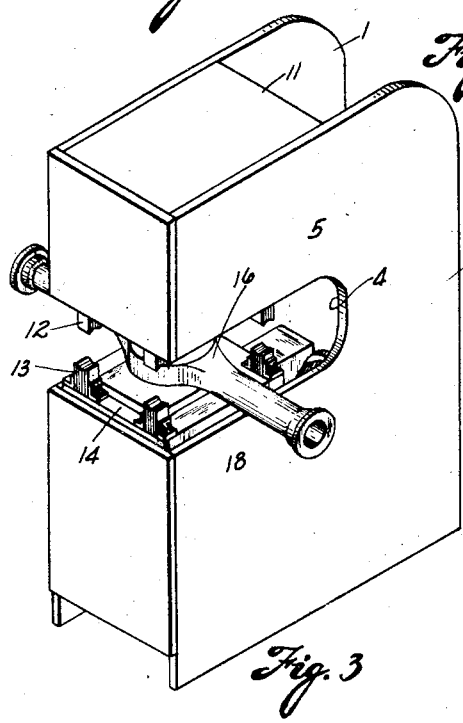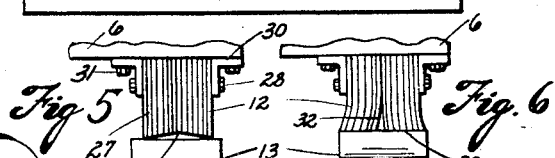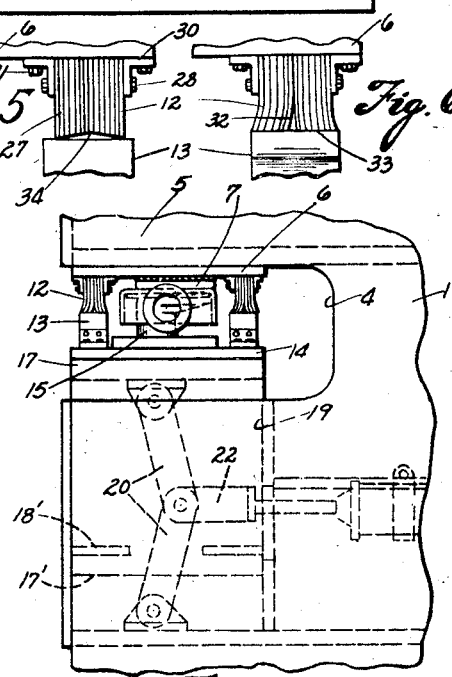

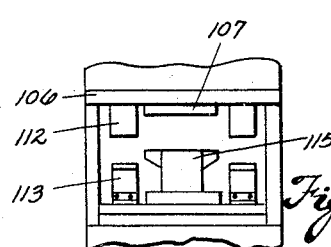
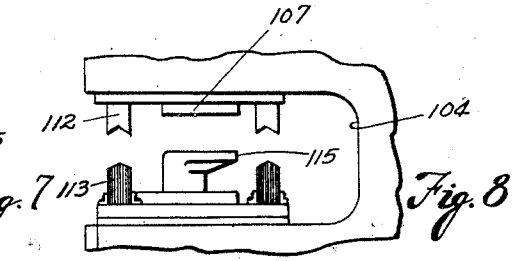
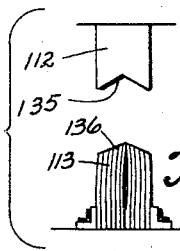
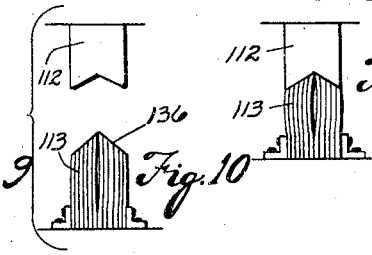
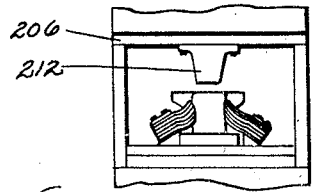
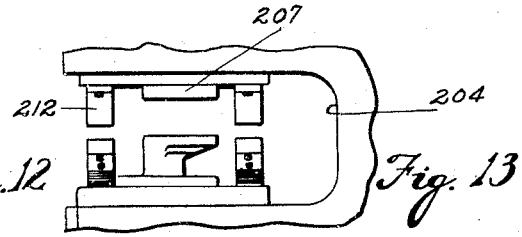
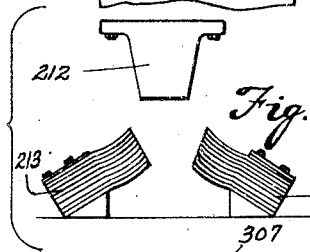
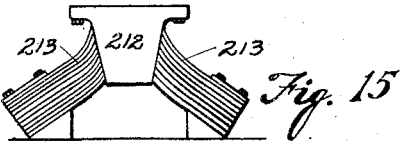
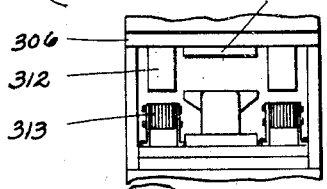
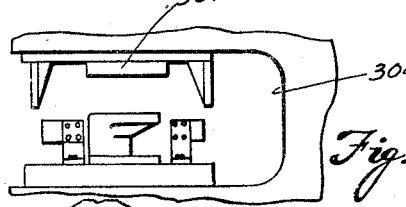
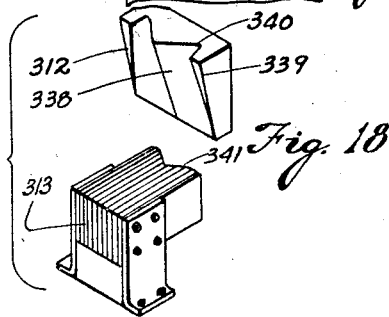
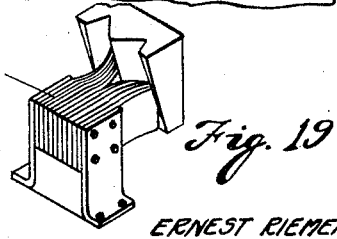
INVENTOR.
ERNEST RIEMENSCHNEIDER
BY
ATTORNEY.

2,252,603

UNITED STATES PATENT OFFICE 2,252,603

WELDING MACHINE

Ernest Riemenschneider, Lakewood, Ohio, assignor to The Midland Steel Products Company, Cleveland, Ohio, a corporation of Ohio Application December 30, 1937, Serial No. 182,453

2 Claims. (Cl. 219—4)

This invention relates to new and useful improvements in welding machines.

An important object of the invention is to provide a welding machine including a welding transformer and stationary and movable electrodes in which novel contact means provide the shortest electrical path between the stationary and movable electrodes, and with which current consumption is reduced to a minimum.

Another important object of the invention is to provide contacts which are carried directly by the dies or electrode supports to increase the precision of current timing and the electrical and frictional contact of the contacts as the movable electrode approaches the stationary electrode.

Another object of the invention is to provide a machine having a welding throat of unlimited depth which is entirely cleared when opened to facilitate loading and unloading.

A further object of the invention is to provide a structurally strong frame, not made from the usual heavy castings, but one made principally from rolled, steel plates, thereby reducing its weight and the burden of changing its location in changing plant layouts.

Other objects and advantages of the invention will become apparent during the course of the following description.

In the accompanying drawings forming a part of the description and wherein like numerals are employed to designate like parts throughout the several views, Fig. 1 is a front elevation of the welding machine, Fig. 2 is a side elevation of the same, Fig. 3 is a perspective view of the welding machine, Fig. 4 is an enlarged fragmentary side elevation of a portion of the welding machine showing the electrodes in welding position, Figs. 5 and 6 are enlarged views showing the contacts, Fig. 7 is a front view of the welding throat showing a modified form of contact, Fig. 8 is a side elevation of the same, Fig. 9 shows one form of modified contact in which the outside leaves or blades, buckle first, in engaging the wedge contact, Fig. 10 shows a variation thereof in which the inside leaves or blades of the contact, flex first, in making engagement with the upper contact, Fig. 11 is a view showing the upper and lower contacts engaged, Fig. 12 is a front elevation of the welding throat with another modified form of contact, Fig. 13 is a side elevation of the same, Fig. 14 is a view of this modified form of contact prior to engagement with the complementary contact, Fig. 15 is a view showing the modified contacts engaged, Fig. 16 is a front elevation of the welding throat with a further modified form of contact structure, Fig. 17 is a side elevation of the same, Fig. 18 is an enlarged perspective view showing this modified form of contact prior to engagement, Fig. 19 is a similar view showing the two contacts in engagement.

Referring now in detail to the drawings, the numeral 1 designates a pair of side members for the welding machine frame which are made preferably from rolled steel sections, primarily held in spaced parallel relationship by means of an upper horizontal frame 2 and a lower horizontal frame 3. These side members are provided with relatively deep horizontal recesses 4 to provide a welding throat of unlimited depth. These recesses provide the machine with an overhanging hollow head portion 5 to which is secured a conductor plate 6, insulated from which is an upper electrode 7 connected at 8 to one end of the secondary winding 9 of a welding transformer 10. This welding transformer is disposed in the hollow overhanging head portion 5 which is closed at its top by a horizontal bridge plate 11 connecting the two sides of the frame.

To the conductor plate 6, adjacent its four corners, are secured upper contacts 12 adapted to engage with lower contacts 13 mounted upon a conductor plate 14 at its four corners and which serves in conducting welding current through a lower vertically movable electrode 15 which is of the anvil type and engages one side of the work and elevates it into engagement with the stationary electrode, so that the welding current passes directly through the work into the upper electrode 7, and thence to the secondary winding of the transformer. In this instance, the work is illustrated as a rear axle housing for an automobile and the particular work to be accomplished in the welding machine is the projection welding of a reinforcing ring inside of the banjo portion of the housing to the walls of the banjo portion for reinforcing purposes.

For moving the lower electrode 15 vertically in ram fashion, the conductor plate 14 is mounted upon a vertically reciprocable plunger or ram having a horizontal top piece 17 supporting the plate 14 and is slidably mounted in the hollow base 18 of the welding machine in a reinforced internal frame work 19 providing a vertical slide or guideway for the ram. This ram has vertical side plates 17' connected to the top piece 17 and slidably engaged with the sides 1 of the frame for guiding in a true straight path. Cross braces 18' rigidly connect the sides 17' in spaced parallel relation.

The lower electrode 15 is raised and lowered by a pair of toggle links 20, one being pivotally connected to the underside of the ram 17 while the lower link is pivotally connected to the base plate 3 in vertical alignment with this pivot. These toggle links are pivotally connected together as at 21 and to the forward end of a piston stem 22 operating in an air or hydraulic cylinder 23 pivotally supported as at 24 in a mounting bracket 25. A suitable control valve, not shown, is provided for controlling the medium to move the piston and the toggle links 20 for raising or lowering the lower electrode at the will of the operator. A supplemental frame 26 is built into the base and may be provided with suitable guides for the piston stem and connecting pin 21 of the toggle links.

In Figs. 1 and 2, the welding machine is shown partially open with the lower movable electrode 15 in a partially lowered position, with the contacts 12 and 13 separated and the welding throat partially open and in condition for the reception of work between the electrodes. After the lower electrode has been moved to its lowermost position so that the base plate or ram 14 is down within the hollow base of the machine, the work 16 is placed upon the lower anvil electrode. The operator then manipulates either a hand or foot control valve for admitting medium into the cylinder 23 whereupon its piston is moved outwardly causing the toggle links 20 to straighten to the position shown in Fig. 4 so that the work is forced against the upper electrode and the contacts 12 and 13 engage one another, thereby completing the secondary circuit and causing the current flow in the secondary winding in the direction of the arrows through the conductor 6, upper contacts 12, thence into the lower contacts 13, through the conductor 14, thence upwardly through the lower electrodes 15 and the work to be passed into the upper stationary electrode 7, to the other end of the secondary winding, in order that the path of welding current is reduced to the very minimum, as well as the KVA to operate the machine. After the welding has been completed, the operating cylinder moves the toggle links 20 to disengage the contacts 12 and 13 and to lower the lower electrode with the work to a point where the work engages the sides of the throat or other suitable abutment as the ram 14 lowers into the base and thereby automatically lifts the work from electrode 15.

Each of the contacts 12 and 13 in Figs. 1 to 6 inclusive is composed of a plurality of closely juxtaposed blades or leaves of good conducting material laid side by side in contact throughout to form laminations firmly clamped together by a pair of bolts 28 extending transversely through the blades and through the arms of angled brackets 30 rigidly and adjustably connected by screws 31 to the respective conductor plates. These blades or leaves are flexible and resilient and while firmly clamped in a group, are separated in half as at 32 to place them under tension, while their free edges 33 are ground or machined into a common horizontal plane as shown in Fig. 6. The blades of the upper contacts 12 are arranged in planes normal to the blades of the lower contact 13 so that the free edges of the blades of the upper contacts 12 engage the free edges of the blades of the lower electrodes, transversely thereof.

In Fig. 5, the contacting edges as a group, of the upper and lower contacts 12 and 13, may be formed in wedge shaped surface, so that when the lower movable electrode 15 is being moved to welding position, the blades of the two contacts progressively flex outwardly to be tensioned; so that in final welding position, the edges of all blades of the upper contacts engage all free edges of the blades of the lower contacts, rather than all edges of the upper and lower blades contacting simultaneously as in Fig. 6 when the lower electrode is moved to welding position. In the modified forms of contacts shown in Figs. 7 to 19 inclusive, one contact 112, 212 or 312, of each complementary pair of contacts is a one piece rigid block of good conducting material, while the other contact 113, 213 or 313, is a laminated spring blade structure adapted to flex and/or yield while the individual blades thereof slide upon one another with a wiping action to enhance the conductivity of the contacts.

In Figs. 7 to 10 inclusive, the parts which correspond with those in Figs. 1 to 6 inclusive have been marked with corresponding reference numerals with the addition of the numeral 100. The numeral 112 designates the upper stationary contacts which are made of solid blocks of good conducting material with their contact surface 135 of inverted V-shaped configuration to form the blocks with substantially a wedge shaped cavity as shown. As stated previously, the lower movable contacts 113 are composed of a group of the blades, their contacting edges 136 being formed, as a group, in inverted V-shaped form. The angularity of the arms of this V-shaped formation on the lower flexible blades is different from that of the V-shaped recess in the upper stationary contacts as illustrated. In Fig. 9, the angle of the edges 136 is less than its upper complementary contact, which when the contacts move into engagement, causes a flexing of the outside blades first, whereas in Fig. 10 the angle 136 of the free edges of the laminated contacts is greater than the inclination of the edges on its complementary contact thereby causing the inside blades or leaves to flex first as it moves into engagement with its complementary contact 112. Fig. 11 shows the final seating engagement between the upper and lower contacts wherein the free edges of all of the blades of the movable contact 113 are crowded in and firmly engaged with the walls of the wedge-shaped cavity in the stationary complementary contact 112, with blades being slightly flexed to cause the wiping action between blades which is found desirable.

In Figs. 12 to 15 inclusive, parts corresponding with those in Figs. 1 to 4 have been designated with the same reference characters plus the addition of the numeral 200. In this modification, only two sets of contacts are provided for the upper and lower electrodes instead of four as in the previous modifications, but in this instance, the complementary contacts are provided by a single rigid wedge-shaped contact 212 operating in conjunction with a pair of flexible contacts 213, each of which is composed of a series of laminated blades clamped firmly together as in the preceding modifications, but arranged in inclined relation on opposite sides of the contact 212, so that the free edges of the laminated blades engage and ride upon the wedge shaped surfaces of the contact 212 causing them to tension to greater degrees the farther down the contact 212 moves between these two groups of laminated blades. Fig. 15 shows the relative positions of the contacts when in final fully engaged position.

Figs. 16 to 19 inclusive show a further modified form of the contacts, they being designated by the same numerals as in the preceding forms with the addition of the numeral 300. In this modification, the stationary contact 312 is rigid and is generally in the form of a wedge both vertically and horizontally. It is provided with a central V-shaped rib 338 which is of increased depth adjacent its upper end. Bounding the lateral sides of the rib 338 are a pair of ribs 339 defining a limiting V-shaped channel 340 on either side of the central rib 338, which limits the outward flexing of the laminated blades constituting contact 313. In this instance, the contacts 313 are arranged horizontally, as illustrated, and their free edges 341, as a group, which contact with the complementary contacts, are formed with a V-shaped cavity, the sides of which substantially equal the angularity of the low point of the wedge shaped rib 338. As the two contacts move closer together, it will be apparent that the wedge formation of the rib 338 causes more tensioning and flexing of the blades of the contact 313, the closer they approach one another, until the outermost blades seat and are crowded into the recesses or grooves 340. In all of these forms shown in Figs. 7 to 19 inclusive the intensity of the frictional and electrical contact increases the closer the contacts move toward one another.

It will be understood that various changes and substitutions in the various modifications and arrangement of parts may be resorted to without departing from the spirit of the invention or the scope of the appended claims.

I claim:

1. In a welding machine, a substantially C-shaped narrow hollow frame, the opening between the horizontal arms of which provides a welding throat of unlimited depth with one hollow arm forming an overhanging head, a transformer mounted in the free end of said head, contacts connected with the secondary winding and secured to the head, a stationary electrode carried by the head and insulated from the same and the contacts, a vertically movable work carrying electrode in the lower hollow arm of said frame, mechanism arranged longitudinally in the lower arm of the frame for vertically moving the movable electrode, and contacts movable with said movable electrode adapted to be engaged with the first named contacts when the movable electrode is moved to welding position, said movable electrode and contacts being movable down entirely within the lower hollow arm of the frame to fully open the throat for the insertion of work and to cause engagement of the work with the sides of the throat to automatically lift the work from the lower electrode as the latter moves down within the lower hollow arm of the frame.

2. A welding machine comprising a frame composed of a pair of rolled section parallel side plates having deep horizontal notches extending from the front edges rearwardly a substantial distance to provide a welding throat of unlimited depth, and a long narrow hollow base with a hollow overhanging head, means for securing the sides in spaced rigid relation, a transformer mounted in said hollow head and having a secondary winding, a stationary electrode carried by said head, a rectilinearly movable work supporting platform vertically slidable in said hollow base and adapted to move down within said base to open said throat wider and automatically lift the work from the platform, means for raising and lowering said platform, a movable electrode carried by the platform, and complementary contacts carried by the platform and head adapted to be mutually engaged to complete the secondary circuit when the platform with the movable electrode is moved to welding position.

ERNEST RIEMENSCHNEIDER.